United States Patent
Draese et al.

(10) Patent No.: US 12,216,645 B1
(45) Date of Patent: Feb. 4, 2025

(54) GENERATING SEARCH QUERY AUTOCOMPLETE SUGGESTIONS BASED ON METADATA DERIVED FROM EVENT DATA

(71) Applicant: Cribl, Inc., San Francisco, CA (US)

(72) Inventors: Oliver Draese, Los Gatos, CA (US); Dritan Bitincka, Edgewater, NJ (US); Ledion Bitincka, San Francisco, CA (US); Janusz Sobolewski, Mazowieckie (PL)

(73) Assignee: Cribl, Inc., San Francisco, CA (US)

( * ) Notice: Subject to any disclaimer, the term of this patent is extended or adjusted under 35 U.S.C. 154(b) by 0 days.

(21) Appl. No.: 18/504,775

(22) Filed: Nov. 8, 2023

(51) Int. Cl.
*G06F 16/242* (2019.01)

(52) U.S. Cl.
CPC .................. *G06F 16/2423* (2019.01)

(58) Field of Classification Search
CPC ................................................ G06F 16/2423
USPC ........................................................ 707/767
See application file for complete search history.

(56) References Cited

U.S. PATENT DOCUMENTS

| | | | |
|---|---|---|---|
| 8,135,729 | B2 | 3/2012 | Brewer et al. |
| 8,700,673 | B2 | 4/2014 | Raghavan et al. |
| 8,996,559 | B2 | 3/2015 | Ganti et al. |
| 9,235,654 | B1 | 1/2016 | Gupta et al. |
| 9,489,119 | B1 * | 11/2016 | Smith, Jr. ............ G06F 3/04845 |
| 10,078,686 | B2 * | 9/2018 | Ushanov ............... G06F 16/832 |
| 10,134,067 | B2 | 11/2018 | Gangadharappa et al. |
| 10,540,365 | B2 | 1/2020 | Sinha et al. |
| 11,263,268 | B1 * | 3/2022 | Bourbie .............. G06F 16/2228 |
| 11,269,871 | B1 * | 3/2022 | Bigdelu ................ G06F 16/252 |
| 11,444,903 | B1 * | 9/2022 | Brevoort ............. H04L 12/1831 |
| 11,573,989 | B2 | 2/2023 | Bailey et al. |

(Continued)

FOREIGN PATENT DOCUMENTS

KR 100818357 4/2008

OTHER PUBLICATIONS

Hawking, David, et al., "An enterprise search paradigm based on extended query auto-completion. Do we still need search and navigation?", ADCS '13, Brisbane, QLD, Australia, Dec. 5-6, 2013, pp. 18-25.*

(Continued)

*Primary Examiner* — Robert Stevens
(74) *Attorney, Agent, or Firm* — Young Basile Hanlon & MacFarlane, P.C.

(57) ABSTRACT

In some aspects, search functionality is provided in an observability analysis system. In some implementations, search results are obtained from prior search queries, the search results include a subset of event data generated in a computing environment. Metadata are generated by analyzing the event data to identify a plurality of fields and values for each of the plurality of fields. A partial search query is received through a user interface at a first computer node; the partial search query represents at least a portion of a request to search the event data. Autocomplete suggestions are generated at the first computer node based on the partial search query and the metadata. Each of the autocomplete suggestions includes a suggested field selected from the plurality of fields, a suggested value selected from the values, or both. At least one of the autocomplete suggestions is displayed in the user interface.

20 Claims, 10 Drawing Sheets

(56) References Cited

U.S. PATENT DOCUMENTS

| | | | |
|---|---|---|---|
| 2008/0065617 A1* | 3/2008 | Burke | G06F 16/951 |
| | | | 707/999.005 |
| 2010/0010989 A1 | 1/2010 | Li et al. | |
| 2012/0117102 A1 | 5/2012 | Meyerzon et al. | |
| 2013/0086067 A1* | 4/2013 | Khoussainova | G06F 16/3322 |
| | | | 707/E17.046 |
| 2017/0024424 A1 | 1/2017 | Almohizea | |
| 2020/0042651 A1* | 2/2020 | Curtis | G06F 3/0482 |
| 2021/0303557 A1 | 9/2021 | Pike et al. | |
| 2022/0188661 A1* | 6/2022 | Tappin | G06F 16/248 |
| 2023/0359241 A1* | 11/2023 | Faaborg | G06V 40/168 |
| 2023/0376483 A1 | 11/2023 | Sharp et al. | |
| 2023/0376491 A1 | 11/2023 | Sharp et al. | |
| 2023/0376498 A1 | 11/2023 | Sharp et al. | |
| 2023/0376509 A1 | 11/2023 | Sharp et al. | |

OTHER PUBLICATIONS

Patel, Dhaval, et al., "Event-centric Query Suggestion for Online News", ArXiv, Cornell University, arXiv:2201.04716v1, Jan. 12, 2022, pp. 39:1-39:32 (32 pages).*

Krishnan, Unni, et al., "Abstraction of query auto completion logs for anonymity-preserving analysis", Information Retrieval Journal, vol. 22, Jun. 6, 2019, pp. 499-524.*

* cited by examiner

GENERATING SEARCH QUERY AUTOCOMPLETE SUGGESTIONS BASED ON METADATA DERIVED FROM EVENT DATA

BACKGROUND

The following description relates to search query autocomplete suggestions based on metadata derived from event data, for example, in an observability analysis process.

Observability analysis is used to coordinate analysis and produce results in a number of contexts. For example, observability analysis can provide unified routing of various types of machine data to multiple destinations while adapting data shapes and controlling data volumes. In some implementations, an observability analysis system allows an organization to interrogate machine data from its environment without knowing in advance the questions that will be asked. Observability analysis may also provide monitoring and alerting functions, which allow systematic observation of data for known conditions that require specific action or attention.

DETAILED DESCRIPTION

Figure 1:
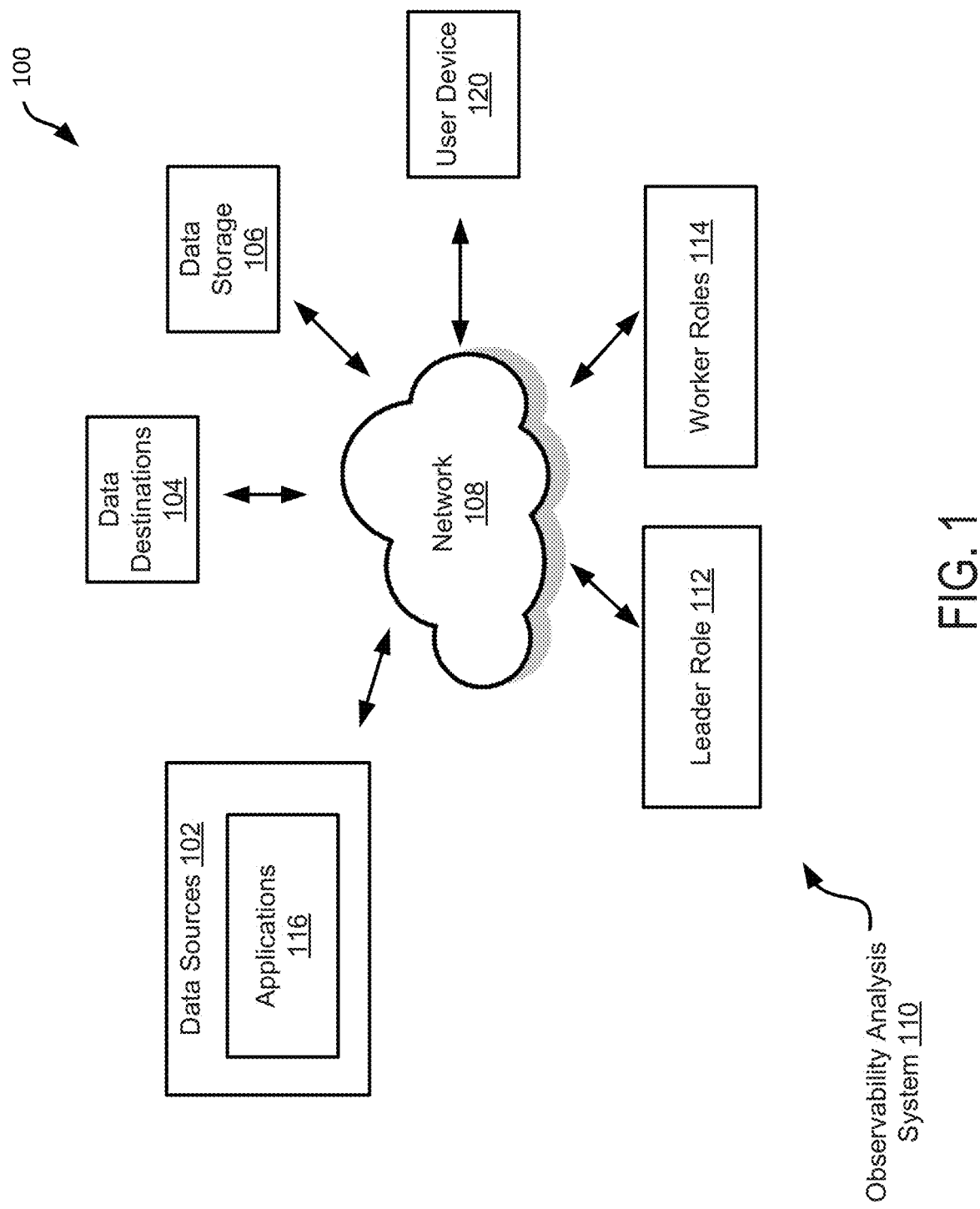
FIG. 1 is a block diagram showing aspects of an example computing environment that includes an observability analysis system.

In some implementations, an observability analysis system provides search functionality that allows event data in a dataset to be searched. In some implementations, the search functionality searches event data without a priori knowledge of the characteristics of the dataset being searched, for example, without prior knowledge of the shape, structure, size, age, format, compression status or other attributes of the dataset. In some cases, prior knowledge of the dataset can improve future search experience especially when the same dataset is searched during a future search process. The knowledge about the dataset can be obtained by analyzing the dataset and stored as metadata. For example, a prior search query can be executed in an observability analysis system; and search results which include a subset of event data in a dataset can be obtained. At the same time, metadata of the dataset can be also generated. The metadata may include fields and values of the respective fields in the dataset. The metadata can be stored; and when a partial search query representing a subsequent request to search the event data in the dataset is received through a user interface, the metadata associated with the dataset can be accessed and used to generate autocomplete suggestions. One or more of the autocomplete suggestions can be displayed in the user interface, which can be further selected or referenced by the user to complete the partial search query.

In some aspects of what is described here, when a partial search query representing a portion of a request to search a dataset is received, autocomplete suggestions are generated based on the partial search query and metadata associated with the dataset. In some implementations, the methods and systems presented here can assist with entering search queries in a user interface, improve accuracy, save time, improve the user experience, reduce errors in search queries, and allow targeted search based on the data shape of the dataset. Accordingly, aspects of the systems and techniques described here can be used to improve the operation of computer systems, information and data management systems, data processing systems, observability analysis systems, and other classes of technology.

In some implementations, search functionality can enable personnel (e.g., administrators, users, etc.) with a single search tool to query event data without having to re-collect the event data. In some implementations, search functionality can be performed on data at rest, e.g., data that is already collected and stored. For example, when event data is already in S3 (or similar) or even collected in a system of analysis, like Splunk, Elastic, etc., in an organization's observability lake or even within existing systems, such event data can also be queried. In some instances, the event data to be queried can include structured, semi-structured, and unstructured data. The search functionality can be performed based on any terms, patterns, value/pairs, and any data type. In some implementations, the search functionality can vastly increase the scope of analysis without requiring the cost or complexity of first shipping, ingesting, and storing the data. In some implementations, search functionality is not restricted to a single location, a single bucket, or a single vendor platform for the data.

The systems and techniques described here can provide technical advantages and improvements over existing technologies. As an example, search functionality provided in an observability analysis system can allow enterprise computer systems to extract value from observability analysis systems more efficiently while conserving computing resources. This can improve accessibility to data in endpoint devices, lakes, S3, the edge, etc. Search functionality may require minimal setup to use and no extra infrastructure. Search functionality can quickly scale to provide ephemeral on-demand compute to handle large search jobs and scale back once complete.

FIG. 1 is a block diagram showing aspects of an example computing environment 100 that includes an observability analysis system 110. The example computing environment 100 shown in FIG. 1 includes data sources 102, data destinations 104, data storage 106, network 108, and a user device 120. The data sources 102 includes an application 116 that produces data that can be searched, for example, by the observability analysis system 110 or another type of search system. The computing environment 100 may include additional or different features, and the elements of the computing environment 100 may be configured to operate as described with respect to FIG. 1 or in another manner.

In some implementations, the computing environment 100 contains the computing infrastructure of a business enterprise, an organization or another type of entity or group of entities. During operation, various data sources 102 in an organization's computing infrastructure produce volumes of machine data that contain valuable or useful information. These data sources can include applications 116 and other types of computer resources. The machine data may include data generated by the organization itself, data received from external entities, or a combination. By way of example, the machine data can include network packet data, sensor data, application program data, observability data, and other types of data. Observability data can include, for example, system logs, error logs, stack traces, system performance data, or any other data that provides information about computing infrastructure and applications (e.g., performance data and diagnostic information). The observability analysis system 110 can receive and process the machine data generated by the data sources 102. For example, the machine data can be processed to diagnose performance problems, monitor user interactions, and to derive other insights about the computing environment 100. Generally, the machine data generated by the data sources 102 does not have to use a common format or structure, and the observability analysis system 110 can generate structured output data having a specified form, format, or type. The output generated by the observability analysis system can be delivered to data destinations 104, data storage 106, or both. In some cases, the data delivered to the data storage 106 includes the original machine data that was generated by the data sources 102, and the observability analysis system 110 can later retrieve and process the machine data that was stored on the data storage 106. In some instances, the data source 102 may include a search engine as part of the observability analysis system 110.

In general, the observability analysis system 110 can provide several services for processing and structuring machine data for an enterprise or other organization. In some instances, the observability analysis system 110 provides schema-agnostic processing, which can include, for example, enriching, aggregating, sampling, suppressing, or dropping fields from nested structures, raw logs, and other types of machine data. The observability analysis system 110 may also function as a universal adapter for any type of machine data destination. For example, the observability analysis system 110 may be configured to normalize, de-normalize, and adapt schemas for routing data to multiple destinations. The observability analysis system 110 may also provide protocol support, allowing enterprises to work with existing data collectors, shippers, and agents, and providing simple protocols for new data collectors. In some cases, the observability analysis system 110 can test and validate new configurations and reproduce how machine data was processed. The observability analysis system 110 may also have responsive configurability, including rapid reconfiguration to selectively allow more verbosity with pushdown to data destinations or collectors. The observability analysis system 110 may also provide reliable delivery (e.g., at least once delivery semantics) to ensure data integrity.

The data sources 102, data destinations 104, data storage 106, observability analysis system 110, and the user device 120 are each implemented by one or more computer systems that have computational resources (e.g., hardware, software, firmware) that are used to communicate with each other and to perform other operations. For example, each computer system may be implemented as the example computer system 700 shown in FIG. 7 or components thereof. In some implementations, computer systems in the computing environment 100 can be implemented in various types of devices, such as, for example, laptops, desktops, workstations, smartphones, tablets, sensors, routers, mobile devices, Internet of Things (IoT) devices, and other types of devices. Aspects of the computing environment 100 can be deployed on private computing resources (e.g., private enterprise servers, etc.), cloud-based computing resources, or a combination thereof. Moreover, the computing environment 100 may include or utilize other types of computing resources, such as, for example, edge computing, fog computing, etc.

The data sources 102, data destinations 104, data storage 106, observability analysis system 110, and the user device 120 and possibly other computer systems or devices communicate with each other over the network 108. The example network 108 can include all or part of a data communication network or another type of communication link. For example, the network 108 can include one or more wired or wireless connections, one or more wired or wireless networks, or other communication channels. In some examples, the network 108 includes a Local Area Network (LAN), a Wide Area Network (WAN), a private network, an enterprise network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

The data sources 102 can include multiple user devices, servers, sensors, routers, firewalls, switches, virtual machines, containers, or a combination of these and other types of computer devices or computing infrastructure components. The data sources 102 detect, monitor, create, or otherwise produce machine data during their operation. The machine data can be provided to other devices and systems through the network 108. In some cases, the machine data is streamed to the observability analysis system 110 as input data.

The data sources 102 can include data sources designated as push sources (examples include Splunk TCP, Splunk HEC, Syslog, Elasticsearch API, TCP JSON, TCP Raw, HTTP/S, Raw HTTP/S, Kinesis Firehose, SNMP Trap, Metrics, and others), pull sources (examples include Kafka, Kinesis Streams, SQS, S3, Google Cloud Pub/Sub, Azure Blob Storage, Azure Event Hubs, Office 365 Services, Office 365 Activity, Office 365 Message Trace, Prometheus, and others), and other types of data sources. The data sources 102 can also include other applications 116.

In the example shown in FIG. 1, the application 116 includes a collection of computer instructions that constitute a computer program. The computer instructions can be compiled or interpreted. An application 116 can be contained in a single module or can be statically or dynamically linked with other libraries. The libraries can be provided by the operating system or the application provider.

The data destinations 104 can include multiple user devices, servers, databases, analytics systems, data storage systems, or a combination of these and other types of computer systems. The data destinations 104 can include, for example, log analytics platforms, time series databases (TSDBs), distributed tracing systems, security information and event management (SIEM) or user behavior analytics (UBA) systems, and event streaming systems or data lakes (e.g., a system or repository of data stored in its natural/raw format). The machine data from the data sources 102 or the output data produced by the observability analysis system 110 can be communicated to the data destinations 104 through the network 108.

The data storage 106 can include multiple user devices, servers, databases, hosted services, or a combination of these and other types of data storage systems. Generally, the data storage 106 can operate as a data source or a data destination (or both). In some examples, the data storage 106 includes a local or remote filesystem location, a network file system (NFS), Amazon S3 buckets, S3-compatible stores, other cloud-based data storage systems, enterprise databases, systems that provide access to data through REST API calls or custom scripts, or a combination of these and other data storage systems. Machine data from the data sources 102 as well as data analytics and other output from the observability analysis system 110, can be communicated to the data storage 106 through the network 108.

The observability analysis system 110 may be used to monitor, track, and triage events by processing the machine data from the data sources 102. The observability analysis system 110 can receive an event data stream from each of the data sources 102 and identify the event data stream as input data to be processed by the observability analysis system 110. The observability analysis system 110 generates output data by applying observability analysis processes to the input data and communicates the output data to the data destinations 104. In some implementations, the observability analysis system 110 operates as a buffer between data sources and data destinations, such that all data sources send their data to the observability analysis system 110, which handles filtering and routing the data to proper data destinations.

In some implementations, the observability analysis system 110 unifies data processing and collection across many types of machine data (e.g., metrics, logs, and traces). The machine data can be processed by the observability analysis system 110 by enriching it and reducing or eliminating noise and waste. The observability analysis system 110 may also deliver the processed data to any tool in an enterprise designed to work with observability data. For example, the observability analysis system 110 may analyze event data and send analytics to multiple data destinations 104, thereby enabling the systematic observation of event data for known conditions that require attention or other action. Consequently, the observability analysis system 110 can decouple sources of machine data from data destinations and provide a buffer that makes many, diverse types of machine data easily consumable.

In some example implementations, the observability analysis system 110 can operate on any type of machine data generated by the data sources 102 to properly observe, monitor, and secure the running of an enterprise's infrastructure and applications 116 while minimizing overlap, wasted resources, and cost. Specifically, instead of using different tools for processing different types of machine data, the observability analysis system 110 can unify data collection and processing for all types of machine data (e.g., logs, metrics, and traces 222A, 222B shown in FIG. 2) and route the processed machine data to multiple data destinations 104. Unifying data collection can minimize or reduce redundant agents with duplicate instrumentation and duplicate collection for the multiple destinations. Unifying processing may allow routing of processed machine data to disparate data destinations 104 while adapting data shapes and controlling data volumes.

In an example, the observability analysis system 110 obtains DogStatsd metrics, processes the DogStatsd metrics (e.g., by enriching the metrics), sends processed data having high cardinality to a first destination (e.g., Honeycomb), and processed data having low cardinality to a second, different destination (e.g., Datadog). In another example, the observability analysis system 110 obtains windows event logs, sends full fidelity processed data to a first destination (e.g., an S3 bucket), and sends a subset (e.g., where irrelevant events are removed from the full fidelity processed data) to one or more second, different destinations (e.g., Elastic and Exabeam). In another example, machine data is obtained from a Splunk forwarder and processed (e.g., sampled). The raw processed data may be sent to a first destination (e.g., Splunk). The raw processed data may further be parsed, and structured events may be sent to a second destination (e.g., Snowflake).

The example observability analysis system 110 shown in FIG. 1 includes a leader role 112 and multiple worker role 114. The leader role 112 leads the overall operation of the observability analysis system 110 by configuring and monitoring the worker roles 114; the worker roles 114 receive event data streams from the data sources 102 and data storage 106, apply observability analysis processes to the event data, and deliver output data to the data destinations 104 and data storage 106.

The observability analysis system 110 may deploy the leader role 112 and a number of worker roles 114 on a single computer node or on many computer nodes. For example, the leader role 112 and one or more worker roles 114 may be deployed on the same computer node. Or in some cases, the leader role 112 and each worker role 114 may be deployed on distinct computer nodes. The distinct computer nodes can be, for example, distinct computer devices, virtual machines, containers, processors, or other types of computer nodes.

The user device 120, the observability analysis system 110, or both, can provide a user interface for the observability analysis system 110. Aspects of the user interface can be rendered on a display (e.g., the display 750 in FIG. 7) or otherwise presented to a user. The user interface may be generated by an observability analysis application that interacts with the observability analysis system 110. The observability analysis application can be deployed as software that includes application programming interfaces (APIs), graphical user interfaces (GUIs), and other modules.

In some implementations, an observability analysis application can be deployed as a file, executable code, or another type of machine-readable instructions executed on the user device 120. The observability analysis application, when executed, may render GUIs for display to a user (e.g., on a touchscreen, a monitor, or other graphical interface device), and the user can interact with the observability analysis application through the GUIs. Certain functionality of the observability analysis application may be performed on the user device 120 or may invoke the APIs, which can access functionality of the observability analysis system 110. The observability analysis application may be rendered and executed within another application (e.g., as a plugin in a web browser), as a standalone application, or otherwise. In some cases, an observability analysis application may be deployed as an installed application on a workstation, as an "app" on a tablet or smartphone, as a cloud-based application that accesses functionality running on one or more remote servers, or otherwise.

In some implementations, the observability analysis system 110 is a standalone computer system that includes only a single computer node. For instance, the observability analysis system 110 can be deployed on the user device 120 or another computer device in the computing environment 100. For example, the observability analysis system 110 can be implemented on a laptop or workstation. The standalone computer system can operate as the leader role 112 and the worker roles 114 and may execute an observability analysis application that provides a user interface as described above. In some cases, the leader role 112 and each of the worker roles 114 are deployed on distinct hardware components (e.g., distinct processors, distinct cores, distinct virtual machines, etc.) within a single computer device. In such cases, the leader role 112 and each of the worker roles 114 can communicate with each other by exchanging signals within the computer device, through a shared memory, or otherwise.

In some implementations, the observability analysis system 110 is deployed on a distributed computer system that includes multiple computer nodes. For instance, the observability analysis system 110 can be deployed on a server cluster, on a cloud-based "serverless" computer system, or another type of distributed computer system. The computer nodes in the distributed computer system may include a leader node operating as the leader role 112 and multiple worker nodes operating as the respective worker roles 114. One or more computer nodes of the distributed computer system (e.g., the leader node) may communicate with the user device 120, for example, through an observability analysis application that provides a user interface as described above. In some cases, the leader node and each of the worker nodes are distinct computer devices in the computing environment 100. In some cases, the leader node and each of the worker nodes can communicate with each other using TCP/IP protocols or other types of network communication protocols transmitted over a network (e.g., the network 108 shown in FIG. 1) or another type of data connection.

In some implementations, the observability analysis system 110 is implemented by software installed on private enterprise servers, a private enterprise computing device, or other types of enterprise computing infrastructure (e.g., one or more computer systems owned and operated by corporate entities, government agencies, other types of enterprises). In such implementations, some or all of the data sources 102, data destinations 104, data storage 106, and the user device 120 can be or include the enterprise's own computer resources, and the network 108 can be or include a private data connection (e.g., an enterprise network or VPN). In some cases, the observability analysis system 110 and the user device 120 (and potentially other elements of the computer environment 100) operate behind a common firewall or other network security system.

In some implementations, the observability analysis system 110 is implemented by software running on a cloud-based computing system that provides a cloud hosting service. For example, the observability analysis system 110 may be deployed as a SaaS system running on the cloud-based computing system. For example, the cloud-based computing system may operate through Amazon® Web Service (AWS) Cloud, Microsoft Azure Cloud, Google Cloud, DNA Nexus, or another third-party cloud. In such implementations, some or all of the data sources 102, data destinations 104, data storage 106, and the user device 120 can interact with the cloud-based computing system through APIs, and the network 108 can be or include a public data connection (e.g., the Internet). In some cases, the observability analysis system 110 and the user device 120 (and potentially other elements of the computer environment 100) operate behind different firewalls, and communication between them can be encrypted or otherwise secured by appropriate protocols (e.g., using public key infrastructure or otherwise).

In some implementations, search functionality is available through the cloud-based computing system and is provided by the observability analysis system 110. In some instances, no additional search agent is required to perform search actions. For search-at-rest (e.g., searching AWS S3 buckets), a search process can automatically launch "executor" processes to perform the query locally. The search functionality of the observability analysis system 110 may be performed according to a leader-to-worker node/endpoint node control protocol, or another type of control protocol.

In some implementations, search functionality is bounded by groups to support role-based access control, application of computing resources, and other functions. A search functionality can be specified in a query. A search source can be defined by one or more datasets, referenced in the query. In certain instances, the number of search sources can be defined in the query by the number of datasets or search strings.

In some implementations, operators that are supported by search functionality of the observability analysis system 110 may include: Cribl—(Default) Custom Cribl operator—Simplifies locating specific events; Search—Locates specific events with specific text strings; Where—Filters events based on a Boolean expressions; Project—Define columns used to display results; Extend—Calculates one or more expressions and assigns the results to fields; Find—Locates specific events; Timestats—Aggregates events by time periods or bins; Extract—Extracts information from a field either via parser or regular expression; Summarize—Produces a table that aggregates the content of the input table; Limit (alias Take)—Defines the number of results to return; and other operators that enable other query capabilities. In some instances, other operators and functions may also be supported by the observability analysis system 110.

In some implementations, search functionality supports multiple functions, including Cribl, Content, Scalar, Statistical and other function types. In some instances, different functions are available in a search language help tab of the user interface of the search functionality to define syntax, rules and provide examples for all Operators and Functions. In some instances, search recommendations may be included in the search functionality, e.g., default search settings, sample search queries, etc. The user interface of the search functionality may also include a history tab for displaying previous search queries. In some implementations, the search functionality supports complex search queries that includes multiple datasets, terms, Boolean logic, etc. These search terms or expressions can be grouped as a single search string. Wildcards may be supported for query bar terms and datasets.

In some cases, during operation, personnel (e.g., system administrators) can connect their user interface to the cloud-based computing system. A search window may appear on the user interface of the search functionality as a peer to the observability analysis system 110. Data to query can be identified, which can be accomplished via datasets in a query or in another manner. In some contexts, a dataset is an addressable set of data defined in the query at various locations including endpoint nodes, cloud-based storage systems (e.g., S3 buckets), etc. Predefined datasets can be included in the search functionality, providing the ability to query state information of the observability analysis system 110 as well as the filesystem of endpoint nodes. These include dataset definitions for leader nodes, endpoint nodes, filesystems, and S3. In some cases, administrators can define and configure their own datasets. In some implementations, the dataset model includes Name the Dataset—any unique identifier; Apply Dataset Provider—Identify external system (e.g., endpoint node, S3 Bucket, etc.); and Apply Dataset Provider Type—this identifies the schema (e.g., Cribl, Filesystem, S3, etc.).

In some instances, a query box (e.g., the query box 402, 502, 602) in the user interface (e.g., the user interfaces in FIGS. 4A-4B, 5A-5B, 6A-6B) can be configured to identify query values. Search functionality may support all personas, as a result the query expression can be simple terms or more complex literals, regexes, JavaScript expressions, etc. In some implementations, data to be queried is identified; and one or more datasets are defined. In some implementations, the search bar at the user interface of the search functionality includes "type-ahead" capability for syntax completion and query history. For example, by just typing "Dat." the type-ahead capability can provide a list of available datasets. In some implementations, the query operators are defined. Functions, terms, strings, and other query operators can be defined in a query and separated by a "|" (pipe).

In certain instances, one or more time ranges for queries can be defined. The one or more time ranges may include real-time windows-seconds, minutes, hours, days; specific time range, e.g., Mar. 20, 2022:06:00-06:30; or others. A search process can be performed according to the query. Discovery data can be returned as part of the search results as line items in table format, charts, or in another manner. The search results can be shaped and discovered data can be aggregated as part of the query (e.g., Project, Extend, Summarize operators) or afterwards with charting options. In some cases, different chart types, color palettes, axis settings, legends to manipulate how results are displayed can be selected or defined/configured by the user. In some examples, the number of search results are limited by the query language, including time range. In certain examples, a number of results returned can also be constrained via the "Limit" operator (e.g., Limit 100 or another number).

In some cases, a search query can specify a location of data to be searched. For example, the search query can indicate or otherwise represent a request to search data stored at a computer node (e.g., any of the data sources 102, any of the data destinations 104, any data storage 106, etc.). The storage location can be specified by a name (e.g., "EnterpriseData1", "DataCenter834", etc.), by a geographical location or region (e.g., "Ashburn, VA"; "US East"; "North America"; etc.), by an IP address or other identifier, or the storage location can be specified in another manner. The search query can implicitly or explicitly represent the location to be searched. For instance, the search query may include an explicit indication of a location to be searched (e.g., based on data entered or selected in a user interface), or the location to be searched may be specified implicitly based on the context of the search query (e.g., search history, etc.), the type of data being searched, etc.

In some cases, search functionality may allow users to tune the scope of the search query as wide or narrow by specifying constraints within the search itself. For example, a "wide" search query can specify a search for instances of 'error' on any workgroup or fleet (which may include a group of devices, equipment, computers or nodes within a small network); a "narrow" search query can specify a search for instances of 'error' on host: xyx, in:/var/log directory; and a query can be anywhere in between the wide and narrow queries based on rules.

In some instances, the search functionality can query data from specific third-party vendor platforms. Third-party search functions and the search functionality of the observability analysis system 110 work independently. Administrators may use search results from the search functionality of the observability analysis system 110 to apply additional configurations to their existing systems and/or configure. The observability analysis system 110 can forward discovered data or other search results to the third-party systems or platforms. When accessing external data stores (e.g., AWS S3), the search functionality can define authentication rights when the specific dataset is defined.

In some implementations, a search query generated by a user device is received at the observability analysis system 110 (e.g., the leader role 112) through the network 108. The observability analysis system 110 can identify one or more data sources 102 according to the search query. The search query is then dispatched to the identified one or more data sources 102 via the network 108.

In some implementations, a search query is generated at the user device 120 based on user input. For instance, the search query may be generated based on search terms entered by a user through a user interface provided by a web browser or other application running on the user device 120. The search query represents a request to search for data that meets specified criteria; for instance, the search query may include search operators that specify target values of parameters. In some examples, a search operator may specify a target value for event type, event time, event origin, event source, or other parameters. When the user device 120 receives or otherwise obtains search results for the search query, the search results can be displayed to the user. For instance, the search results may be displayed in a user interface provided by a web browser or other application running on the user device 120.

In some implementations, the search query is received by an agent (e.g., an agent running at the user device 120, on a server, in the cloud or elsewhere), and the agent can dispatch the search query to an appropriate resource. The agent may dispatch the search query to one or more computer resources, computer systems, or locations associated with the data to be searched. For instance, a search query may be dispatched to a resource, system or location associated with a data source 102, a data destination 104, a data storage 106. Accordingly, the observability analysis system 110 can perform the search at an endpoint node, on a server, on a cloud-based storage facility, or elsewhere.

In some implementations, a search is performed by configuring and executing an observability analysis process. For example, an observability analysis process (e.g., the observability analysis process 200 shown in FIG. 2) can be configured to perform a search according to a search query. Configuring an observability analysis process can include selecting, defining, or configuring any aspect or feature of the observability analysis process. For example, configuring the observability analysis process may include selecting a source that will provide input data for the observability analysis process, selecting a destination where the output data from the observability analysis process will be sent; and determining an execution schedule for multiple federated analytics processes on multiple data sources. In some examples, the federated analytics processes can include filters that are configured based on the search query. For instance, a federated analytics process can be configured to select events according to a search operator, for example, events that match a target value for event type, event time, event origin, event source, etc. In some examples, the data source for the observability analysis process is defined based on the search query. For instance, if a search query specifies a device or application to be searched, the data source for the observability analysis process can be defined as the specified device or application. In some examples, the data destination for the observability analysis process is defined based on the search query. For instance, the agent that dispatched the search query can be defined as the data destination for the observability analysis process.

Figure 2:
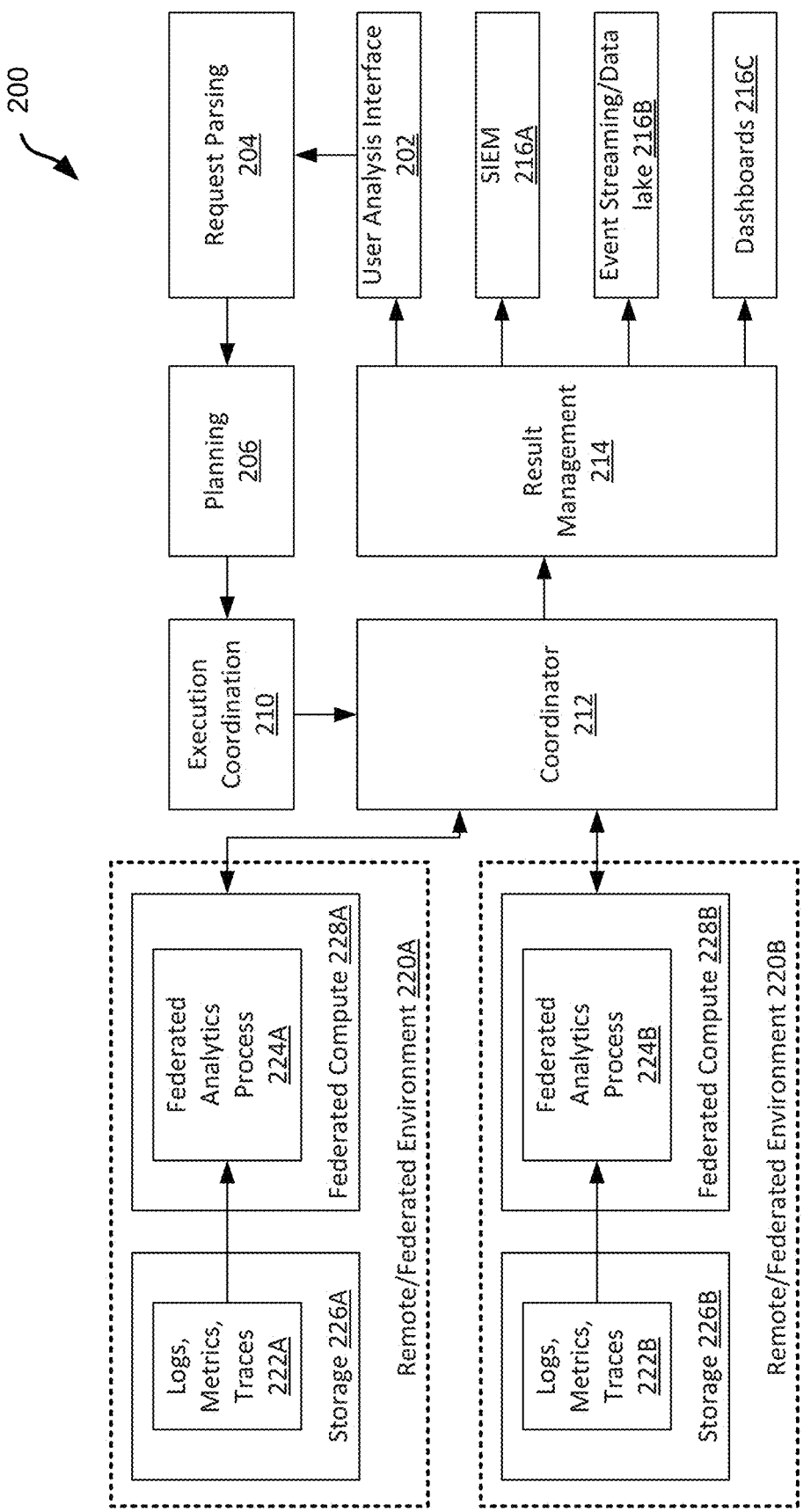
FIG. 2 is a block diagram showing aspects of an example observability analysis process.

FIG. 2 is a block diagram showing aspects of an example observability analysis process 200. In some examples, the observability analysis process 200 may be configured to perform a search. In some instances, the observability analysis process 200 can be configured and applied by one or more of the worker roles 114 or the data sources 102 of the example observability analysis system 110 shown in FIG. 1, or other nodes of an observability analysis system. In some instances, the observability analysis process 200 can be configured based on a search query. The example observability analysis process 200 shown in FIG. 2 includes a user analysis interface 202, a request parsing module 204, a planning module 206, an execution coordination module 210, a coordinator module 212, and a result management module 214.

In some implementations, the user analysis interface 202 is configured to enter search queries, visualizing search results; configure the observability analysis system, and other functions. In some instances, the user analysis interface 202 may be implemented as the example user interfaces 400, 500, 600 in FIGS. 4-6 or in another manner.

In some implementations, the request parsing module 204 is configured to parse the search query received at the user analysis interface 202. For example, a search query may be derived from one language (e.g., Kusto); and the request parsing module 204 may receive the search query and translate the search query into a different language (e.g., a DAG of operators).

In some implementations, the planning module 206 is configured to determine data sources and resources for the execution of the parsed search query. For example, if a search query is to search data on S3, the planning module 206 can determine that the resources required for the execution of the parsed search query includes Lambda executors. For another example, if a search query is to search data on an edge node (e.g., the data source 102), the planning module 206 can determine that the resources required for the execution of the parsed search query by operation of an edge-based collection system.

In some implementations, the execution coordination module 210 is configured to schedule the parsed and planned search query for execution. An observability analysis process, which includes an execution schedule to coordinate query executions across multiple federated environments 220A, 220B, can be created; or a previously configured observability analysis process can be identified and reused. The execution schedule is created and communicated to the coordinator module 212, through which are further communicated to the respective federated environments 220A, 220B for execution. For example, the coordinator module 212 is configured to request a federated compute resource 228A, 228B associated with the federated environment 220A, 220B to perform a federated analytics process 224A, 224B as close as possible to the respective storage unit 226A, 226B, where original events, logs, metrics, traces, or other data are stored. In some instances, the storage unit 226A, 226B may be implemented as a cloud storage such as S3, Azure BLOB, local disks on the edge node, or other federated systems like databases or SIEM.

As shown in FIG. 2, the observability analysis process 200 is applied to data 222A, 222B in the storage units 226A, 226B in the federated environments 220A, 220B, and the observability analysis process 200 generates output data. The federated environment 220A, 220B can include any of the example data sources 102 or data storage 106 described with respect to FIG. 1. In some implementations, the data 222A, 222B including logs, metrics, and traces can be consumed by the federated analytics process 224A, 224B. In some instances, logs can be converted to metrics, metrics can be converted to logs, or other types of data conversion may be applied.

In some instances, the data 222A, 222B in the storage units 226A, 226B represents events as structured or typed key value pairs that describe something that occurred at a given point in time. For example, the data 222A, 222B can contain information in a data format that stores key-value pairs for an arbitrary number of fields or dimensions, e.g., in JSON format or another format. A structured event can have a timestamp and a "name" field. Instrumentation libraries can automatically add other relevant data like the request endpoint, the user-agent, or the database query. In some implementations, components of the data 222A, 222B are provided in the smallest unit of observability (e.g., for a given event type or computing environment). For instance, the data 222A, 222B can include data elements that provide insight into the performance of the respective federated environments 220A, 220B to monitor, track, and triage incidents (e.g., to diagnose issues, reduce downtime, or achieve other system objectives in a computing environment).

In some instances, logs in the data 222A, 222B represent events serialized to disk, possibly in several different formats. For example, logs can be strings of text having an associated timestamp and written to a file (often referred to as a flat log file). The logs can include unstructured logs or structured logs (e.g., in JSON format). For instance, log analysis platforms store logs as time series events, and the logs can be decomposed into a stream of event data.

In some instances, metrics in the data 222A, 222B represent summary information about events, e.g., timers or counters. For example, a metric can have a metric name, a metric value, and a low cardinality set of dimensions. In some implementations, metrics can be aggregated sets of events grouped or collected at regular intervals and stored for low cost and fast retrieval. The metrics are not necessarily discrete and instead represent aggregates of data over a given time span. Types of metric aggregation are diverse (e.g., average, total, minimum, maximum, sum-of-squares), but metrics typically have a timestamp (representing a timespan, not a specific time); a name; one or more numeric values representing some specific aggregated value; and a count of how many events are represented in the aggregate.

In some instances, traces in the data 222A, 222B represent a series of events with a parent/child relationship. A trace may provide information about an entire user interaction and may be displayed in a Gantt-chart-like view. For instance, a trace can be a visualization of events in a computing environment, showing the calling relationship between parent and child events, as well as timing data for each event. In some implementations, individual events that form a trace are called spans. Each span stores a start time, duration, and an identification of a parent event (e.g., indicated in a parent-id field). Spans without an identification of a parent event are rendered as root spans.

For example, a federated analytics process 224A, 224B may be performed by Lambda executors (or other cloud-local compute) in the same region as the cloud storage to minimize the data transfer over longer distances. In some implementations, the federated analytics process 224A, 224B is configured to scan, filter, project, and aggregate the local data as much as possible; and return results to the coordinator module 212, which is further configured to post-aggregate the results. For another example, a federated analytics process 224A, 224B may be performed by an edge-based collection system on locally stored data. In some instances, there are multiple federated analysis processes 224 (e.g., 10s, 100s, etc.) involved in a single execution of a search query. In some implementations, a federated analytics process 224A, 224B may be performed by a third-party query system, or in another manner.

In some implementations, once the data is post-processed and aggregated by the coordinator module 212, output data are stored in and managed by the result management module 214. In some instances, the result management module 214 may include a disk system or cloud storage. The output data from the result management module 214 shown in FIG. 2 include data formatted for log analytics platforms, data formatted for time series databases (TSDBs), data formatted for distributed tracing systems, data formatted for security information and event management (SIEM) or user behavior analytics (UBA) systems, and data formatted for event streaming systems or data lakes (e.g., a system or repository of data stored in its natural/raw format). Log analytics platforms are configured to operate on logs to generate statistics (e.g., web, streaming, and mail server statistics) graphically. TSDBs operate on metrics; for example, TSDBs include Round Robin Database (RRD), Graphite's Whisper, and OpenTSDB. Tracing systems operate on traces to monitor complex interactions, e.g., interactions in a microservice architecture. SIEMs provide real-time analysis of security alerts generated by applications and network hardware. UBA systems detect insider threats, targeted attacks, and financial fraud. The results may be formatted for, and delivered to, other types of data destinations in some cases.

In some instances, the output data in the results management component 214 may be (potentially repeatedly) used in other processes. For example, the output data (e.g., search results) from the result management module 214 may be displayed in the user analysis interface 202; may be replayed in a third-party security information and event management (SIEM) system 216A for further analysis or management; into an event streaming process (e.g., an observability pipeline system) or a data lake 216B for further processing, routing, or storing; into a dashboard 216C, where the output data may be displayed as chart for visualization. In some instances, the output data from the result management module 214 may be used in another process. In some implementations, the result management module 214 is further configured to enforce retention policies and control access (ACL) to the results.

Figure 3:
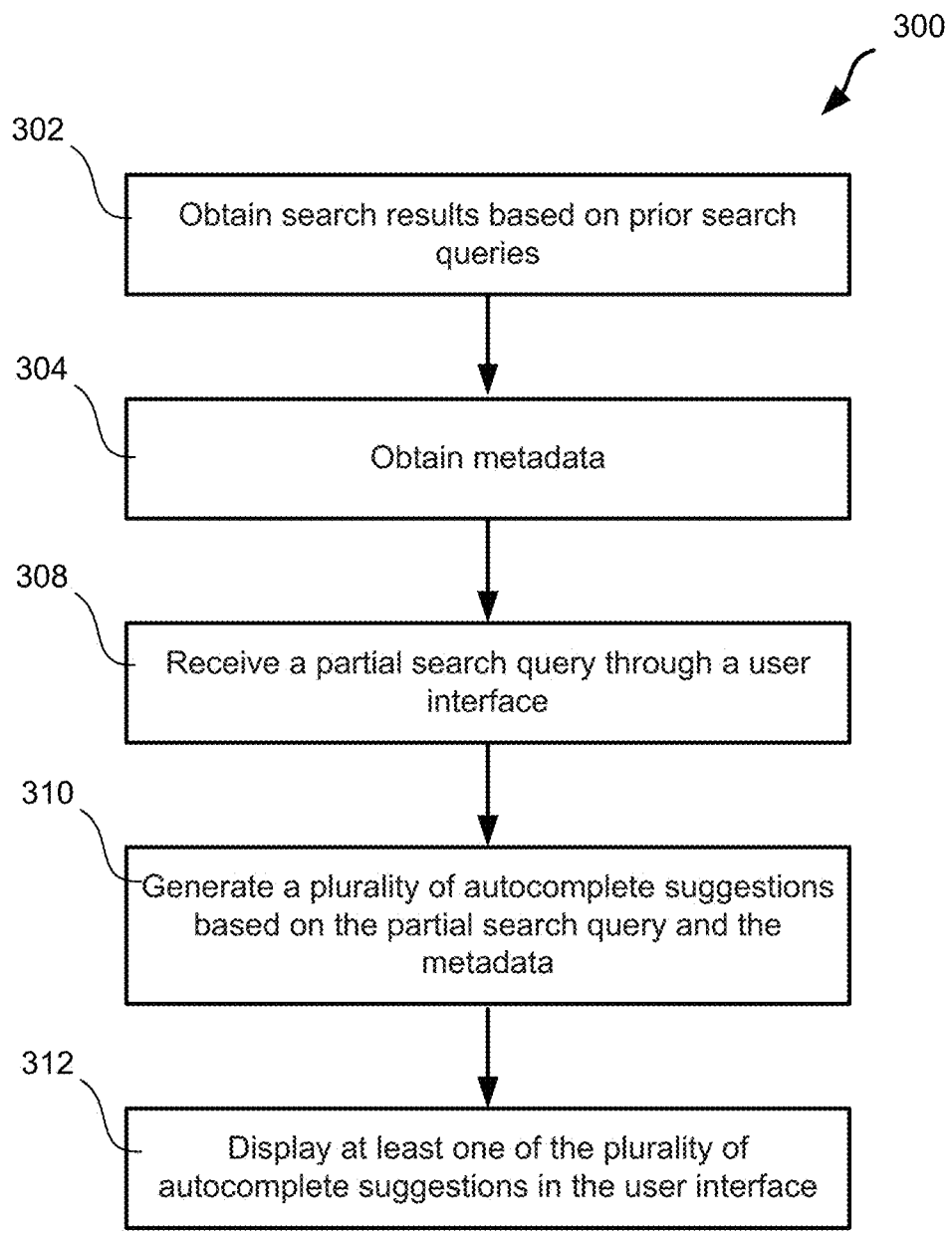
FIG. 3 is a flow chart showing aspects of an example autocomplete suggestion process.

FIG. 3 is a flow chart showing aspects of an example search process 300. In some implementations, the operations of the example process 300 are performed by operation of one or more computer nodes in a computing environment. For example, all or part of the process 300 may be implemented by the user device 120 in FIG. 1 or by a user device in another type of computing environment. For example, aspects of the process 300 may be implemented by a user device and one or more remote devices (e.g., servers or cloud-based computer processes). The example search process 300 may include additional or different operations, including operations performed by additional or different components, and the operations may be performed in the order shown or in another order.

The example search process 300 shown in FIG. 3 allows autocomplete suggestions to be generated based on a partial search query and metadata; the partial search query may target a dataset from which the metadata was derived (e.g., during a prior search process). Accordingly, the process 300 may provide autocomplete suggestions that are more accurate, more useful, more targeted, etc. The autocomplete suggestions can be displayed to a user (e.g., through a user interface) who can select one of the suggestions to be inserted into the partial search query. In some implementations, the methods and techniques presented here can save time, improve the user experience, reduce errors in search queries, and allow targeted search based on metadata derived from a dataset that was previously searched. The example search process 300 may provide additional advantages and improvements in some cases.

At 302, search results generated by an observability analysis system based on prior search queries are obtained. The prior search queries can be generated by the computer node (e.g., based on search terms entered by a user through a user interface), and the search query can then be sent to a remote computer system to execute the search process. For instance, the computer node can send the search queries to a server or a cloud-based system, which conducts or orchestrates a search process based on the search query. The search results generated by the search process can then be sent to the computer node in response to the search query. In some cases, some or all of the search results are displayed (e.g., in the user interface) at the computer node.

In some instances, a search query when generated, includes location information of data sources (e.g., bucket name, object-store prefix, access permissions, etc.) specifying the computer node to be searched; functions and search operators that specify one or more search criteria (e.g., dataset providers, filters, functions, search operators, etc.); location information of results destination specifying where search results are distributed; and other information. In some implementations, a search query requests information about event data at the computer node, which can be identified based on the search query. In some instances, the computer node may include servers, databases, host services, a local or remote file system location, a network file system, Amazon S3 buckets, S3-compatible stores, or other data storage systems. In certain instances, the search query may request information about data stored at multiple computer resources (e.g., multiple distinct computer nodes residing at different geolocations).

In some instances, a search query includes at least one search operator which specifies an event criterion. The event criterion may be configured to filter event data on the computer node. For example, search operators may specify event data that include certain characters or text strings, events generated in a certain timeframe, event data of a certain data type, event data associated with certain processes or users, etc.

In some implementations, the event data includes observability output data generated by an observability analysis process (e.g., the example output data from the result management module 214 in FIG. 2). In other implementations, the event data may be raw machine data and yet unprocessed data generated by processes, or a combination of these.

In some instances, an observability analysis process is configured to perform the search process according to the search query. In some implementations, the observability analysis process includes one or more data sources (e.g., the federated environments 220A, 220B in FIG. 2). When the observability analysis process is configured, the one or more data sources are also determined according to the search query. Search results can be obtained by the observability analysis process, e.g., by performing operations in the example observability analysis process 200 as shown in FIG. 2 or in another manner. In some implementations, the computer node is configured to generate the search results by scanning and processing the event data on the computer node based on the observability analysis process, e.g., filtering, aggregating, enhancing, and other processing operations. In some instances, the search results may be generated by another data processing system by performing another search process.

In some cases, a search process can search a dataset and identify a subset of event data that matches the event criteria specified by the search operators in the search query. In some implementations, multiple sets of search results may be obtained from multiple respective computer nodes by applying search processes at the respective computer nodes. In some instances, multiple sets of search results may be obtained in different manners.

At 304, metadata based on the event data is obtained. The metadata can be generated by the search process based on the prior search queries. Accordingly, the computer node may receive the metadata along with the search results at 302; or the computer node may receive the metadata at a different time. In some instances, during the search processes based on the prior search queries, the source files associated with the target datasets are analyzed to generate the metadata. In some implementations, the metadata associated with the target dataset includes a repository of information, describing the content (e.g., format, field names, values, data types, appearing frequencies, etc.) of the source files in the target dataset without actually storing original data from the source files. In some instances, the metadata generated from the prior search processes can be stored in product-specific storage. In some implementations, a plurality of fields and values for each of the plurality of fields in the source files are identified during the analysis. For example, each of the source files within the dataset may include a plurality of fields. In this case, the metadata generated includes an indication of the plurality of fields identified in the dataset; data types (e.g., string or numerical fields) for each of the plurality of fields; and the values for each of the plurality of fields. In some implementations, the metadata further includes an indication of frequent values for the plurality of fields. Here, the frequent values are the values that occur often in the dataset; for instance, the metadata may indicate the value that occurs most frequently for each field in the dataset. In some cases, the metadata indicate the values that occur most frequently for each field, along with an indication of how frequently each is found in each field (e.g., as a number of occurrences, as a percentage of occurrences, or in another format). In some instances, the metadata may further include other information associated with the dataset and may be generated in another manner.

In some examples, when a search process based on a search query is performed on a dataset including source files A, B, and C, the search process can generate search results (which include a subset of event data from the source files A, B, and C that match the search query) and metadata associated with the source files A, B, and C. An example of metadata from each of source files is shown below:

```
{
A: { numberEvents: 1000,
detectedFields: [
{ name: "source", type: "string" },
{ name: "_time", type: "number" },
{ name: "host", type: "string" },
...
]
},
B: {
```

```
numberEvents: 42,
detectedFields: [
{ name: "answer", type: "string" },
{ name: "_time", type: "number" },
...
]
},
C: {
numberEvents: 1703,
detectedFields: [
{ name: "firstName", type: "string" },
{ name: "lastName", type: "string" },
{ name: "age", type: "number" },
]
}
}
```

As shown in the example above, the metadata associated with the source files A, B, and C, e.g., fields in the source files A, B, and C, can be discovered by analyzing the event data in the source files A, B, and C. The metadata may also indicate the number of events in respective source files, names, values, and types of detected fields in the respective source files. The metadata of the dataset shown in the example above includes string fields, e.g., "source", "host", "firstName", "lastName", "answer", and numerical fields, e.g., "_time", "age". In some instances, the metadata also includes other information of the dataset, e.g., other string fields, number fields, and values of the fields.

At 308, a partial search query is received through a user interface (e.g., a graphical user interface rendered on a display device). For example, the partial search query may include one or more text characters entered in a search field in the user interface. The partial search query represents at least a portion of a request to perform a search process. In some cases, the partial search query targets the same dataset that was searched by a prior search process, e.g., a dataset from which the metadata were derived. In some implementations, the partial search query is received through a user interface at a computer node that has the access to the metadata obtained at 304.

At 310, a plurality of autocomplete suggestions are generated based on the partial search query and the metadata; and at 312, at least one of the plurality of autocomplete suggestions is displayed in the user interface. In some implementations, the metadata associated with the dataset can be dynamically loaded to the computer node to assist with completing the partial search query. In some implementations, each of the autocomplete suggestions includes a suggested field selected from the plurality of fields in the metadata; a suggested value selected from the values in the metadata; or other information. In some implementations, when the metadata includes an indication of frequent values for the plurality of fields, at least one of the plurality of autocomplete suggestions includes the most frequent value for one of the plurality of fields. In some implementations, when the autocomplete suggestions includes respective values for one of the plurality of fields, and the plurality of autocomplete suggestions are displayed in the user interface according to relative frequencies of the respective values (e.g., the most frequent value can be displayed at the top of a list, the second most frequent value can be displayed next on the list, etc.). In some instances, the plurality of autocomplete suggestions are displayed in the user interface based on user's prior search interests. For example, if a particular field has been searched most frequently, that particular field can be displayed at or near the top of a list.

In some implementations, the partial search query comprises an indication of a data source to be searched; and the computer node identifies the metadata associated with the data source to be searched. Continuing the example shown above, when a user types in a partial query in a user interface, as: "dataset='A' | where". The computer node can identify that the dataset (e.g., the event data associated with the source file "A") targeted by the newly received partial search query has been previously searched; and the metadata associated with the dataset and the source files have been generated and stored. The computer node can automatically access the metadata associated with the dataset; and generate a plurality of autocompletion suggestions based on the received partial search query and the associated metadata. For example, the computer node can generate a list of autocompletion suggestions which includes all the fields in the metadata associated with the dataset, when the partial search query "dataset='A' | where" is received. In some implementations, a ranking for the plurality of autocomplete suggestions is identified (e.g., most frequently used in the prior search queries, the field that appears in the greatest number of events, etc.) based on the prior search queries; and the at least one of the plurality of autocomplete suggestions is displayed in the user interface in order according to the ranking. For example, the plurality of autocomplete suggestions are organized in an order according to usage frequencies in the prior search queries, e.g., by the same user.

As the user continues to provide input to the partial search query, e.g., "dataset='A' | where ho", the computer node can further determine that the source file "A" contains a field, named "host" that matches the incomplete field ("ho") of the partial search query; and automatically update the list of autocompletion suggestions as the user types. In other words, the computer node can dynamically update and refine the autocompletion suggestions according to the input from the user to the partial search query in order to provide accurate autocompletion suggestions. The updated autocompletion suggestions can be displayed, which can be selected or referenced by the user to complete the field of the partial search query, e.g., "dataset='A' | where host".

In some implementations, when the partial search query includes a search operator configured for a particular data type, a suggested field having that particular data type can be identified based on the metadata. In other words, the computer node can generate or update the autocompletion suggestions according to the partial search query and the data type of the fields indicated in the metadata. For example, when a partial search query of "dataset='C' | summarize sum ( . . . " is received in the user interface, the computer node can recognize the sum aggregation function in the partial search query and update the autocomplete suggestions by including only numerical fields of the metadata, e.g., age, _time, etc. The autocompletion suggestions can be displayed, which can be selected or referenced by users to complete or continue the search query, e.g., "dataset='C' | summarize sum (age)".

Figure 4A:
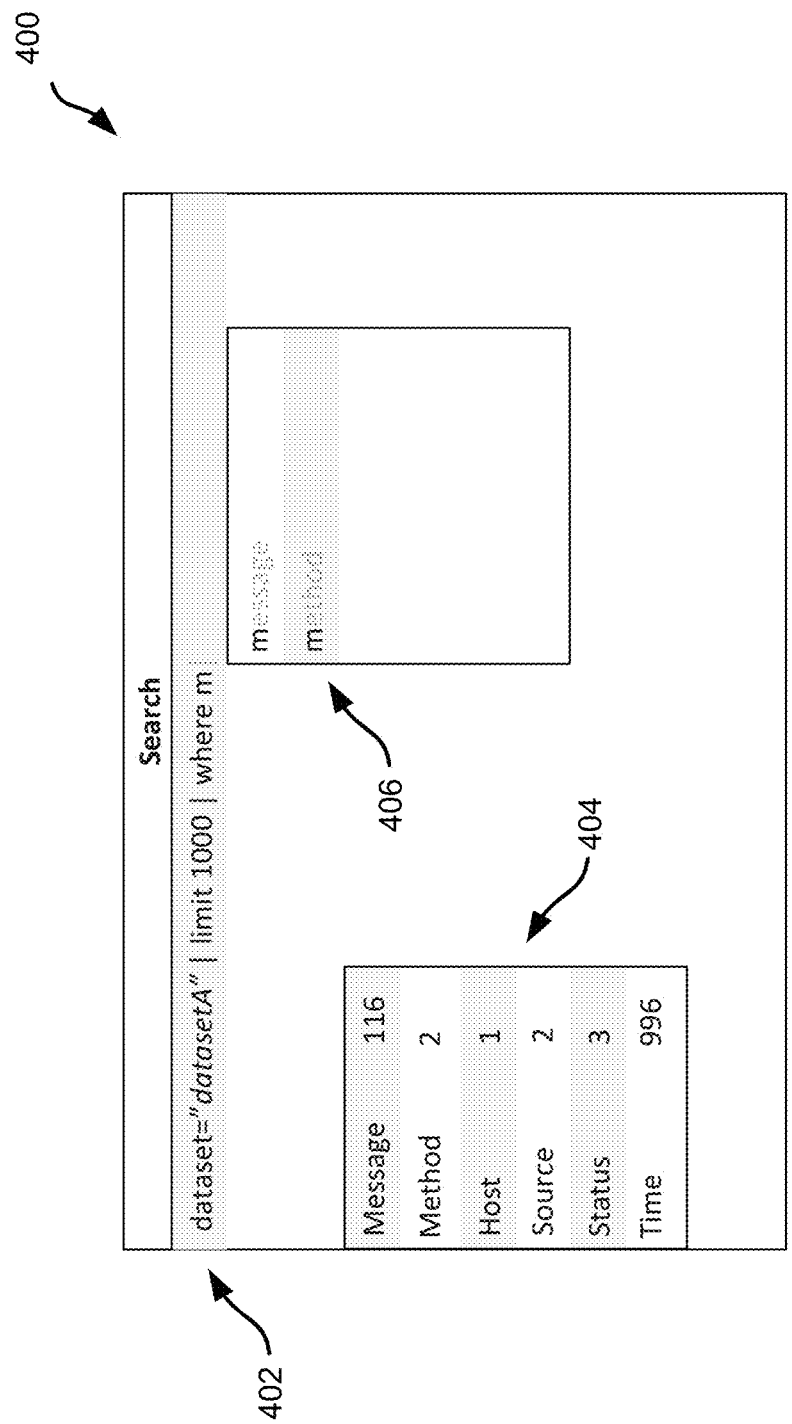
FIG. 4A-4B are schematic diagrams showing aspects of an example user interface.
Figure 4B:
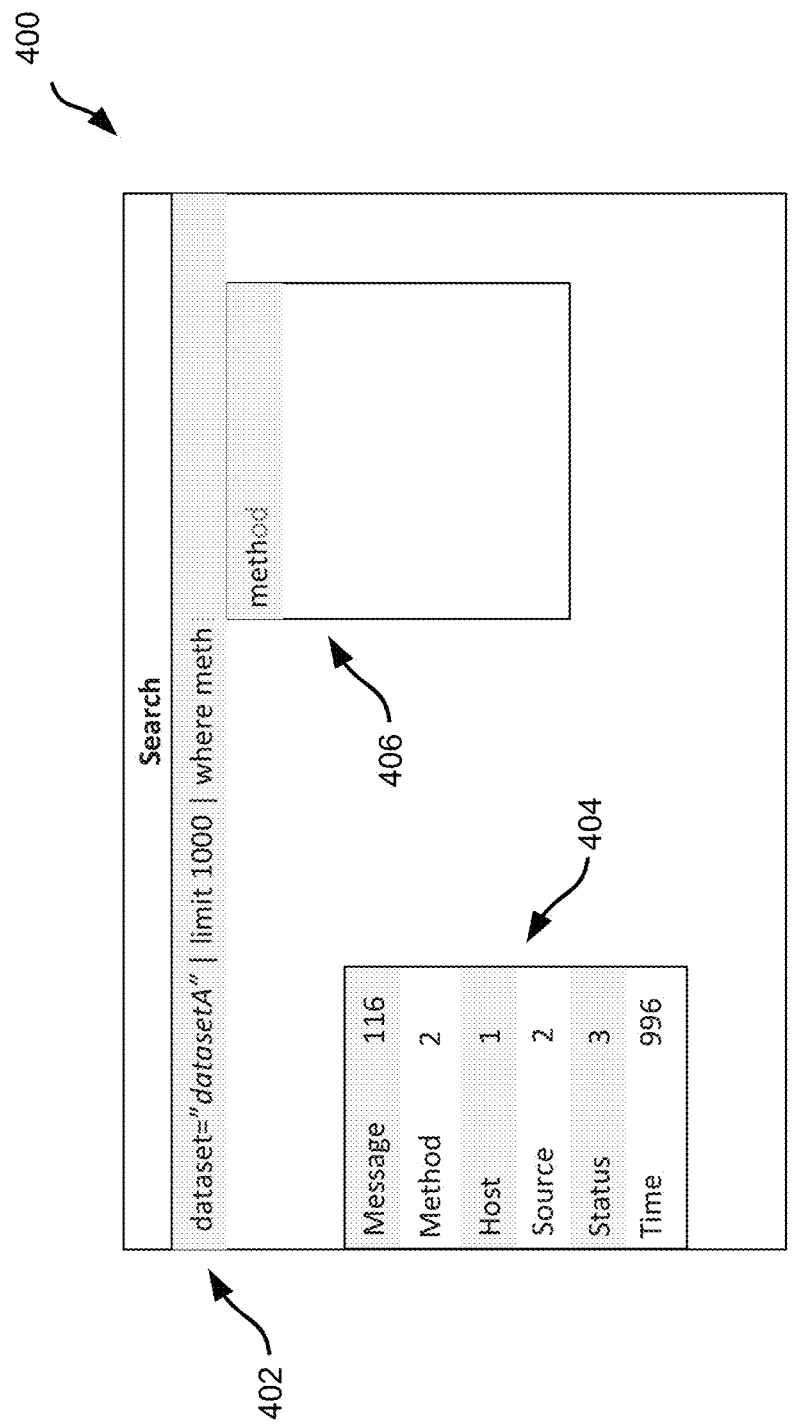

FIGS. 4A-4B are schematic diagrams showing aspects of an example user interface 400. As shown in FIGS. 4A-4B, the user interface 400 includes a query box 402, where a search query can be entered, a metadata box 404 showing metadata associated with the "datasetA", and an autocomplete suggestion box 406 showing a list of autocomplete suggestions generated based on the partial search query and the metadata associated with the "datasetA". The metadata in the metadata box 404 includes a list of fields and respective numbers of events or rows where the fields are present. As shown in FIG. 4A, after having typed the initial characters, "dataset="datasetA" |limit 1000| where m", in the query box 402, the autocomplete suggestions including the "message" and "method" fields to fit into the position in the partial search query in the query box 402 are displayed in the autocomplete suggestion box 406. Entries in the autocomplete suggestions box 406 are ordered according to the numbers of events where the fields are present as shown in the metadata box 404, e.g., the "message" field is displayed as the first one in the list since the "message" field is present in 116 events in "datasetA", and the "method" field is displayed as the second one in the list since the "method" field is present in 2 events in "datasetA". As shown in FIG. 4B, as the user continues to type in the query box 402, "dataset="datasetA" | limit 1000| where meth", the autocomplete suggestions displayed in the autocomplete suggestion box 406 are updated to only include the "method" field. The updated autocomplete suggestions are generated based on the updated partial search query and the metadata associated with the "datasetA".

Figure 5A:
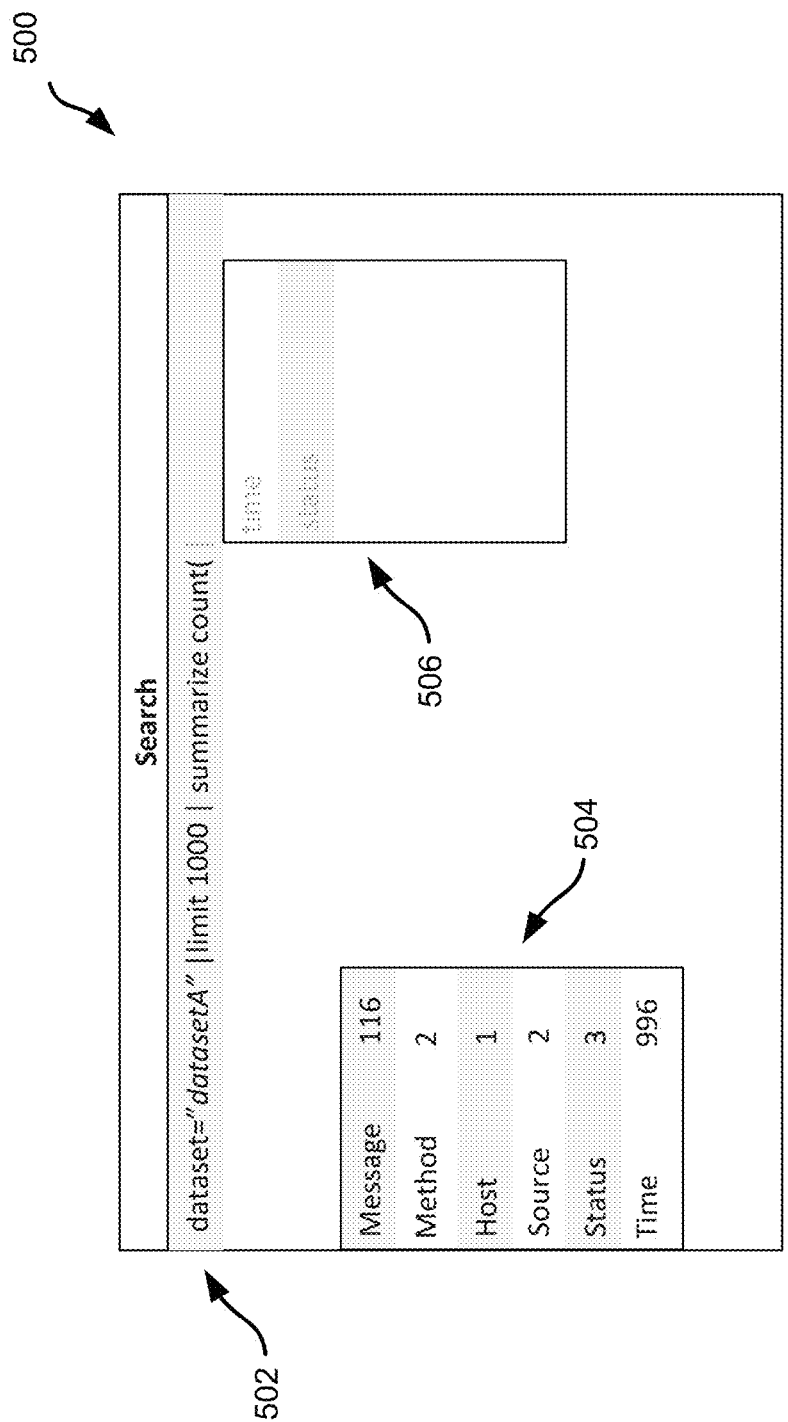
FIG. 5A-5B are schematic diagrams showing aspects of an example user interface.
Figure 5B:
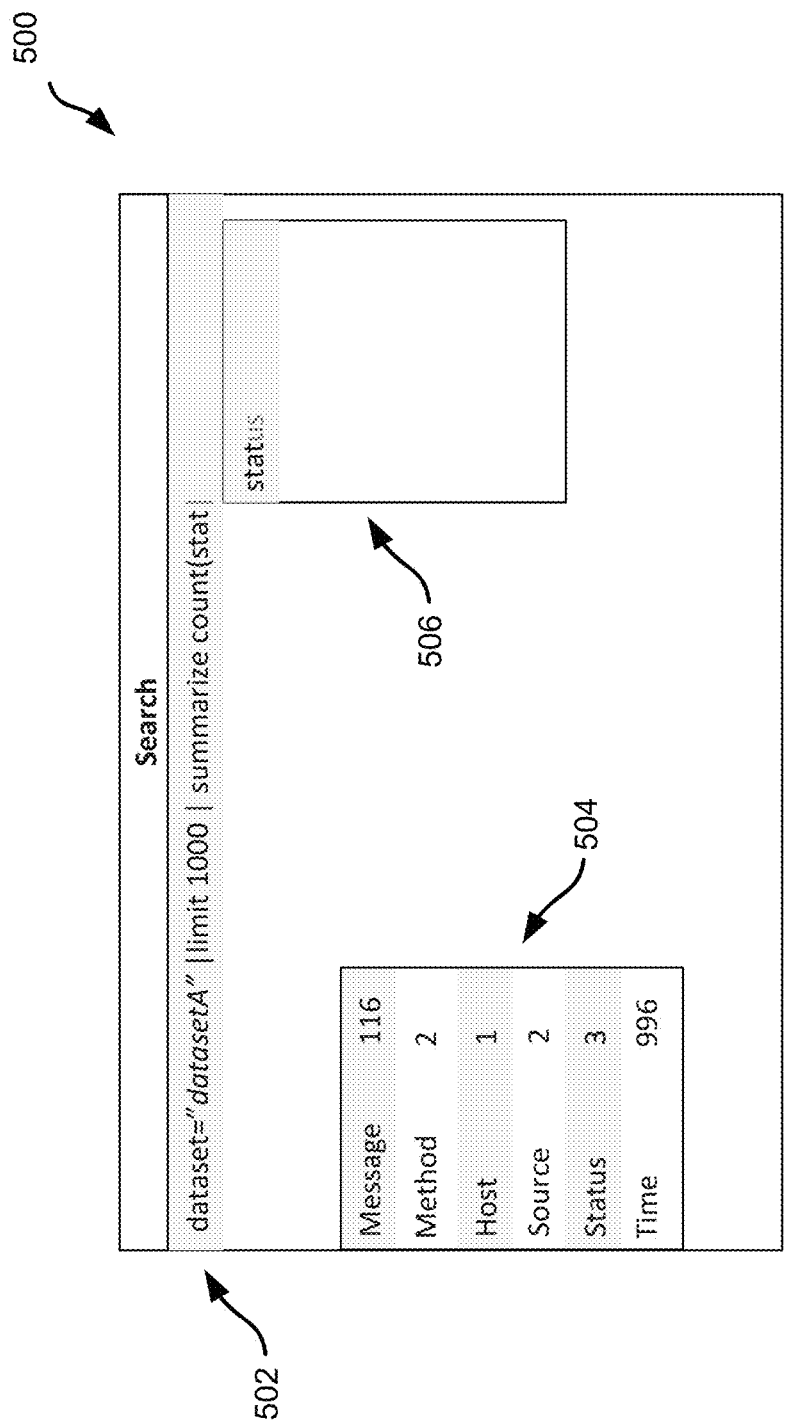

FIGS. 5A-5B are schematic diagrams showing aspects of an example user interface 500. As shown in FIGS. 5A-5B, the user interface 500 includes a query box 502, where a search query can be entered, a metadata box 504 showing metadata associated with the "datasetA", and an autocomplete suggestion box 506 showing a list of autocomplete suggestions generated based on the partial search query and the metadata associated with the "datasetA". The metadata in the metadata box 504 includes a list of fields and respective numbers of events or rows where the fields are present. As shown in FIG. 5A, after having typed the initial characters, "dataset="datasetA" | limit 1000| summarize count(", in the query box 502, the computer node recognizes that the data type associated with the count aggregation function in the partial search query in the query box 502 is a numerical field; and the autocomplete suggestions including the two numerical fields, e.g., the "time" and "status" fields from the metadata, to fit into the position in the partial search query in the query box 502 are displayed in the autocomplete suggestion box 506. Entries in the autocomplete suggestions box 506 are ordered according to the numbers of events where the fields are present as shown in the metadata box 504, e.g., the "time" field is displayed as the first one in the list since the "time" field is present in 996 events in "datasetA", and the "status" field is displayed as the second one in the list since the "status" field is present in 3 events in "datasetA". As shown in FIG. 5B, as the user continues to type in the query box 502, "dataset="datasetA" | limit 1000| summarize count (stat ", the autocomplete suggestions displayed in the autocomplete suggestion box 506 are updated to only include the "status" field. The updated autocomplete suggestions are generated based on the updated partial search query and the metadata associated with the "datasetA".

Figure 6A:
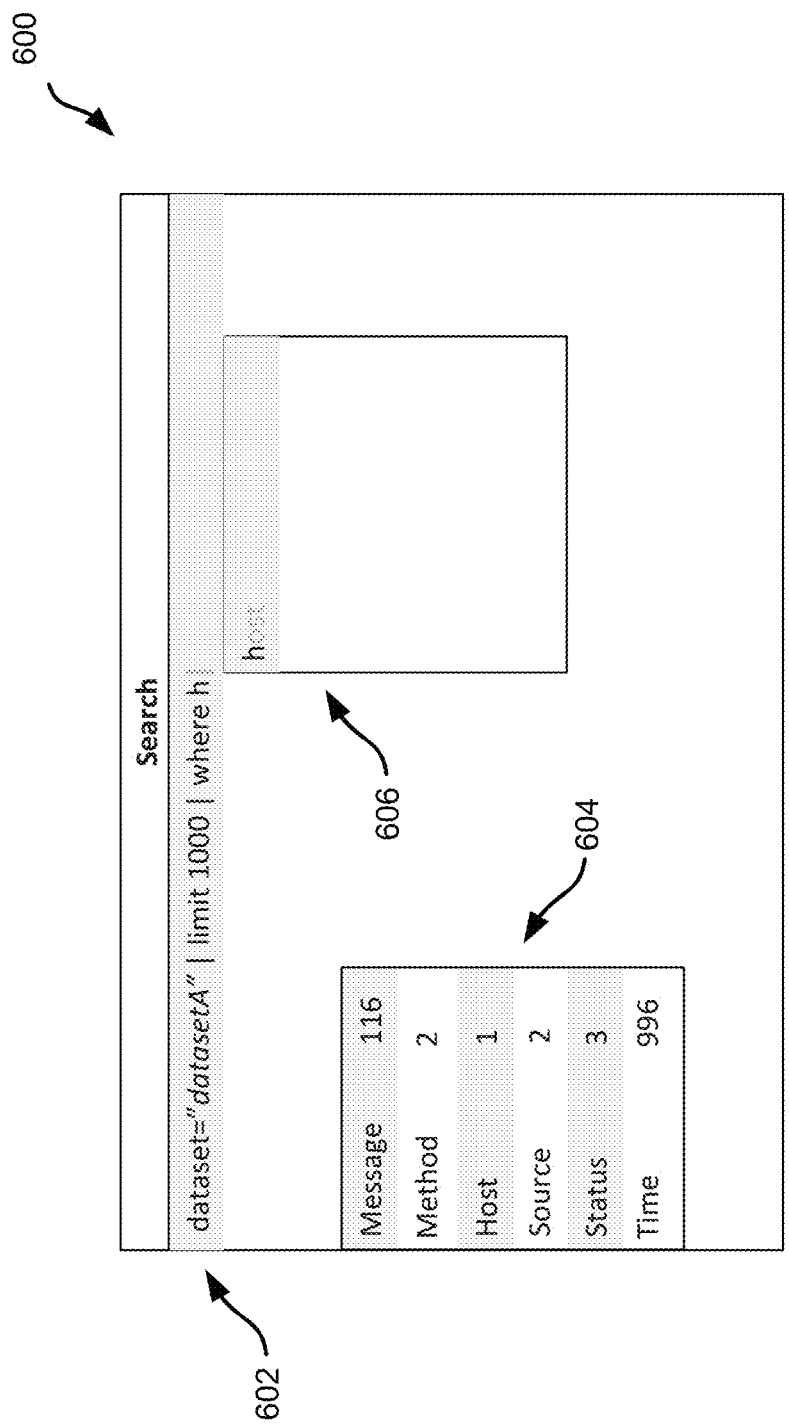
FIG. 6A-6B are schematic diagrams showing aspects of an example user interface.
Figure 6B:
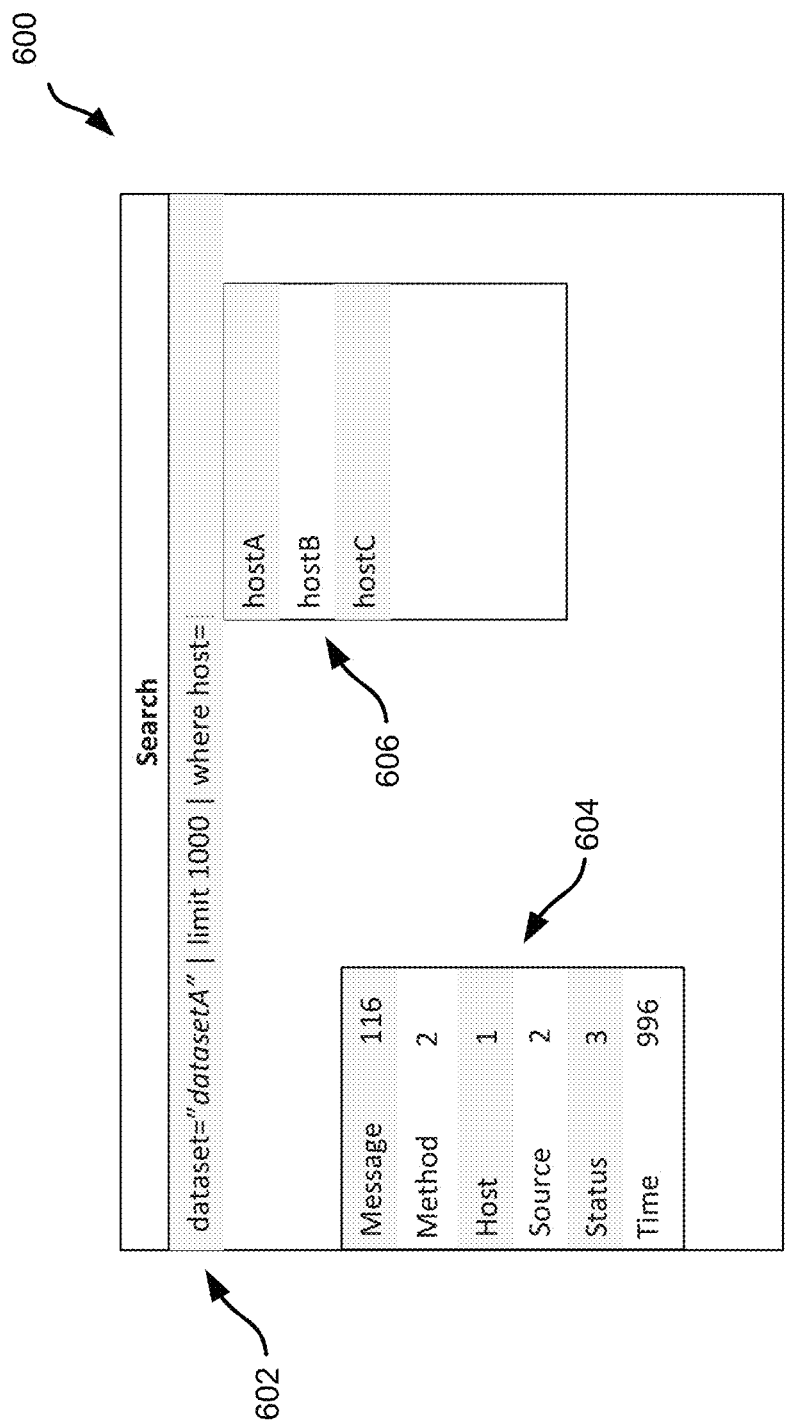

FIGS. 6A-6B are schematic diagrams showing aspects of an example user interface 600. As shown in FIG. 6A, the user interface 600 includes a query box 602, where a search query can be entered, a metadata box 604 showing metadata associated with the "datasetA", and an autocomplete suggestion box 606 showing a list of autocomplete suggestions generated based on the partial search query and the metadata associated with the "datasetA". The metadata in the metadata box 604 includes a list of fields and respective numbers of events or rows where the fields are present. As shown in FIG. 6A, after having typed the initial characters, "dataset="datasetA" |limit 1000| where h", in the query box 602, the autocomplete suggestion including the "host" field to fit into the position in the partial search query in the query box 602 is displayed in the autocomplete suggestion box 606. The autocomplete suggestion box 606 may include other fields that starts with the letter "h"; and entries in the autocomplete suggestions box 606 may be ordered according to the numbers of events where the fields are present as shown in the metadata box 604. As shown in FIG. 6B, as the user continues to type in the query box 602 "dataset="datasetA" |limit 1000| where host=", in the query box 602, the autocomplete suggestions including values for the field "host" to fit into the position in the partial search query in the query box 602 are displayed in the autocomplete suggestion box 606. Entries in the autocomplete suggestions box 606 are ordered according to the relative frequencies, e.g., hostA, hostB, hostC, etc.

In some implementations, after the at least one of the plurality of autocomplete suggestions is displayed in the user interface, a selection of a first autocomplete suggestion is received through the user interface at the computer node, e.g., from the user. In some instances, the partial search query is completed based on the first autocomplete suggestion. In some instances, the partial search query only partially completed based on the first autocomplete suggestion. In this case, the operations 310, 312 can be repeated, for example, when the partial search query includes multiple search criteria, until the request to search the dataset is completed, by receiving selections of second, third, etc. autocomplete suggestions from the user. In this case, the partial search query is completed based on the first, second, third, etc., autocomplete suggestions. After the search query is completed, a search process is configured according to the completed search query; search results based on applying the search process are obtained; and the updated metadata is obtained based on the newly obtained search results, for example, when the source file is modified, changed or otherwise, updated.

Figure 7:
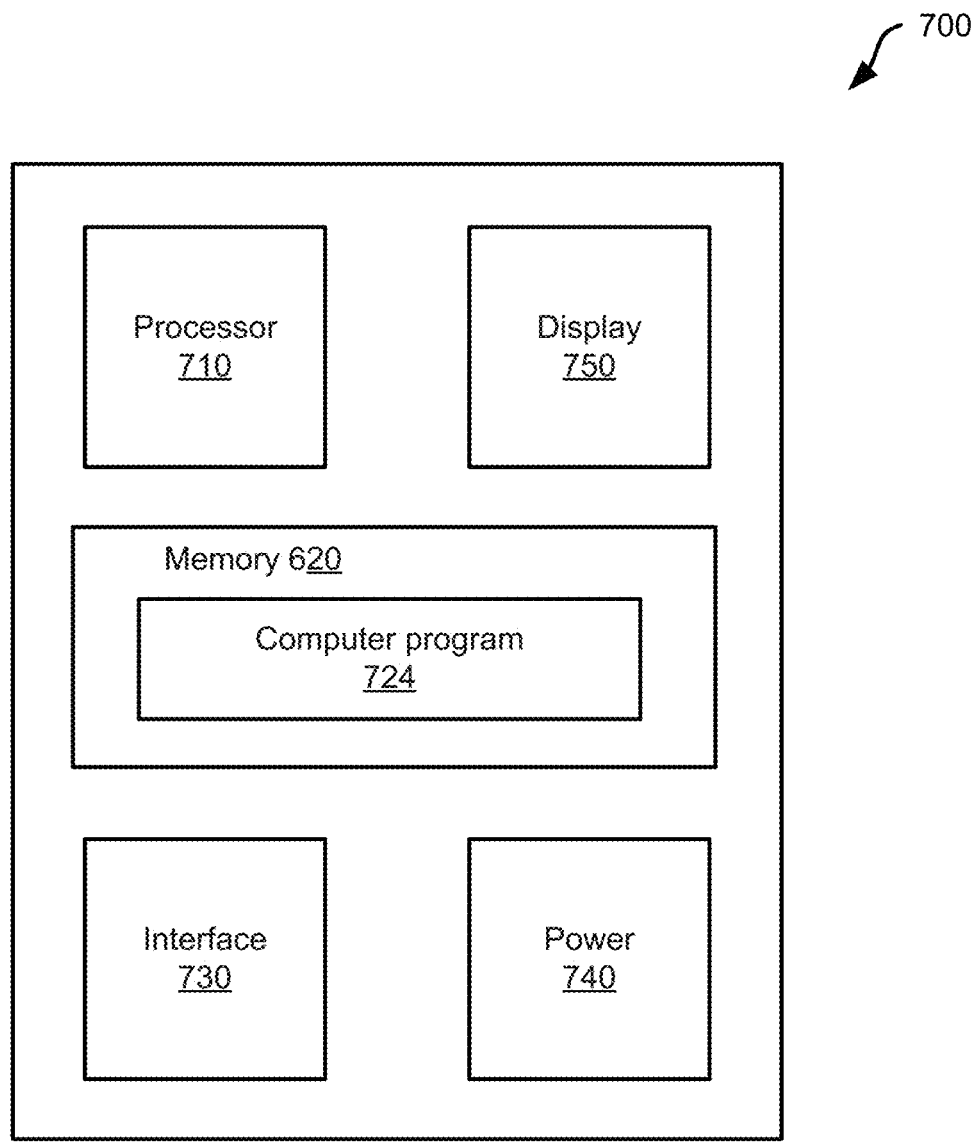
FIG. 7 is a block diagram showing an example computer system.

FIG. 7 is a block diagram showing an example computer system 700 that includes a data processing apparatus and one or more computer-readable storage devices. The term "data-processing apparatus" encompasses all kinds of apparatus, devices, nodes, and machines for processing data, including by way of example, a programmable processor, a computer, a system on a chip, or multiple ones, or combinations, of the foregoing, e.g., processor 710. The apparatus can include special-purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code), e.g., computer program 724, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors, e.g., processor 710, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both, e.g., memory 720. Elements of a computer can include a processor that performs actions in accordance with instructions, and one or more memory devices that store the instructions and data. A computer may also include or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media, and memory devices, including by way of example, semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

The example power unit 740 provides power to the other components of the computer system 700. For example, the other components may operate based on electrical power provided by the power unit 740 through a voltage bus or other connection. In some implementations, the power unit 740 includes a battery or a battery system, for example, a rechargeable battery. In some implementations, the power unit 740 includes an adapter (e.g., an AC adapter) that receives an external power signal (from an external source) and converts the external power signal to an internal power signal conditioned for a component of the computer system 700. The power unit 740 may include other components or operate in another manner.

To provide for interaction with a user, operations can be implemented on a computer having a display device, e.g., display 750, (e.g., a monitor, a touchscreen, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to, and receiving documents from, a device that is used by the user; for example, by sending web pages to a web browser on a user's client device in response to requests received from the web browser, or by sending data to an application on a user's client device in response to requests received from the application.

The computer system 700 may include a single computing device or multiple computers that operate in proximity or generally remote from each other and typically interact through a communication network, e.g., via interface 730. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship between client and server may arise by virtue of computer programs running on the respective computers and having a client-server relationship with each other.

The example interface 730 may provide communication with other systems or devices. In some cases, the interface 730 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 730 includes a wired communication interface (e.g., USB, Ethernet) that can be connected to one or more input/output devices, such as, for example, a keyboard, a pointing device, a scanner, or a networking device such as a switch or router, for example, through a network adapter.

In a general aspect of what is described, search query autocomplete suggestions are generated for a search process based on metadata derived from event data.

In a first example, a search method includes obtaining search results generated by an observability analysis system based on prior search queries, where the search results include a subset of event data generated in a computing environment; obtaining metadata based on the event data, where the metadata are generated by analyzing the event data to identify: a plurality of fields; and values for each of the plurality of fields; after obtaining the metadata, receiving a partial search query through a user interface at a first computer node, where the partial search query represents at least a portion of a request to search the event data; generating, at the first computer node, a plurality of autocomplete suggestions based on the partial search query and the metadata, where each of the autocomplete suggestions includes one or both of a suggested field selected from the plurality of fields; and a suggested value selected from the values; and displaying at least one of the plurality of autocomplete suggestions in the user interface at the first computer node.

Implementations of the first example may include one or more of the following features. The metadata include an indication of the plurality of fields identified; data types for each of the plurality of fields; and the values for each of the plurality of fields. The metadata includes an indication of frequent values for the plurality of fields, and at least one of the plurality of autocomplete suggestions includes the most frequent value for one of the plurality of fields. The plurality of autocomplete suggestions include respective values for one of the plurality of fields, and the plurality of autocomplete suggestions are displayed in the user interface according to relative frequencies of the respective values.

Implementations of the first example may include one or more of the following features. The partial search query includes a search operator configured for a particular data type, and generating the plurality of autocomplete suggestions includes identifying, based on the metadata, a suggested field having the particular data type. The method includes receiving, in response to displaying the at least one of the plurality of autocomplete suggestions, a selection of a first autocomplete suggestion selected through the user interface at the first computer node; generating a first search query based on the first autocomplete suggestion; configuring a search process according to the first search query; obtaining first search results based on applying the search process; and obtaining updated metadata based on the search process.

Implementations of the first example may include one or more of the following features. The method includes generating the metadata based on the event data and the prior search queries; identifying a ranking for the plurality of autocomplete suggestions based on the prior search queries; and displaying the at least one of the plurality of autocomplete suggestions in the user interface in order according to the ranking. The partial search query includes an indication of a data source to be searched, and generating the plurality of autocomplete suggestions comprises identifying a subset of the metadata that is based on event data from the data source to be searched.

In a second example, a computer node including one or more processors and memory storing instructions that are configured, when executed by the one or more processors, to perform one or more operations of the first example.

In a third example, a non-transitory computer-readable medium stores instructions that are operable when executed by data processing apparatus to perform one or more operations of the first example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A search method comprising:
obtaining search results generated by an observability analysis system based on prior search queries, the search results comprising a subset of event data generated in a computing environment;
obtaining metadata based on the event data, wherein the metadata are generated by analyzing the event data to identify:
a plurality of fields; and
values for each of the plurality of fields;
after obtaining the metadata, receiving a partial search query through a user interface at a first computer node, the partial search query representing at least a portion of a request to search the event data;
generating, at the first computer node, a plurality of autocomplete suggestions based on the partial search query and the metadata, wherein each of the plurality of autocomplete suggestions comprises one or both of:
a suggested field selected from the plurality of fields; and
a suggested value selected from the values; and
displaying at least one of the plurality of autocomplete suggestions in the user interface at the first computer node.

2. The method of claim 1, wherein the metadata comprises an indication of:
the plurality of fields identified;
data types for each of the plurality of fields; and
the values for each of the plurality of fields.

3. The method of claim 2, wherein the metadata comprises an indication of frequent values for the plurality of fields, and at least one of the plurality of autocomplete suggestions comprises the most frequent value for one of the plurality of fields.

4. The method of claim 3, wherein the plurality of autocomplete suggestions comprise respective values for one of the plurality of fields, and the plurality of autocomplete suggestions are displayed in the user interface according to relative frequencies of the respective values.

5. The method of claim 1, wherein the partial search query comprises a search operator configured for a particular data type, and generating the plurality of autocomplete suggestions comprises identifying, based on the metadata, a suggested field having the particular data type.

6. The method of claim 1, comprising:
receiving, in response to displaying the at least one of the plurality of autocomplete suggestions, a selection of a first autocomplete suggestion selected through the user interface at the first computer node;
generating a first search query based on the first autocomplete suggestion;
configuring a search process according to the first search query;
obtaining first search results based on applying the search process; and
obtaining updated metadata based on the search process.

7. The method of claim 1, comprising:
generating the metadata based on the event data and the prior search queries;
identifying a ranking for the plurality of autocomplete suggestions based on the prior search queries; and
displaying the at least one of the plurality of autocomplete suggestions in the user interface in order according to the ranking.

8. The method of claim 1, wherein the partial search query comprises an indication of a data source to be searched, and generating the plurality of autocomplete suggestions comprises identifying a subset of the metadata that is based on event data from the data source to be searched.

9. A computer node comprising:
one or more processors;
a display device; and
memory storing instructions that are configured, when executed by the one or more processors, to perform one or more operations comprising:
obtaining search results generated by an observability analysis system based on prior search queries, the search results comprising a subset of event data generated in a computing environment;
obtaining metadata based on the event data, wherein the metadata are generated by analyzing the event data to identify:
a plurality of fields; and
values for each of the plurality of fields;
after obtaining the metadata, receiving a partial search query through a user interface on the display device, the partial search query representing at least a portion of a request to search the event data;
generating a plurality of autocomplete suggestions based on the partial search query and the metadata, wherein each of the plurality of autocomplete suggestions comprises one or both of:
a suggested field selected from the plurality of fields; and
a suggested value selected from the values; and
displaying at least one of the plurality of autocomplete suggestions in the user interface.

10. The computer node of claim 9, wherein the metadata comprises an indication of:
the plurality of fields identified;
data types for each of the plurality of fields; and
the values for each of the plurality of fields.

11. The computer node of claim 10, wherein the metadata comprises an indication of frequent values for the plurality of fields, and at least one of the plurality of autocomplete suggestions comprises the most frequent value for one of the plurality of fields.

12. The computer node of claim 11, wherein the plurality of autocomplete suggestions comprise respective values for one of the plurality of fields, and the plurality of autocomplete suggestions are displayed in the user interface according to relative frequencies of the respective values.

13. The computer node of claim 9, wherein the partial search query comprises a search operator configured for a particular data type, and generating the plurality of autocomplete suggestions comprises identifying, based on the metadata, a suggested field having the particular data type.

14. The computer node of claim 9, wherein the operations comprise:
receiving, in response to displaying the at least one of the plurality of autocomplete suggestions, a selection of a first autocomplete suggestion selected through the user interface at the first computer node;
generating a first search query based on the first autocomplete suggestion;
configuring a search process according to the first search query;
obtaining first search results based on applying the search process; and
obtaining updated metadata based on the search process.

15. The computer node of claim 9, wherein the operations comprise:

generating the metadata based on the event data and the prior search queries;
identifying a ranking for the plurality of autocomplete suggestions based on the prior search queries; and
displaying the at least one of the plurality of autocomplete suggestions in the user interface in order according to the ranking.

16. The computer node of claim 9, wherein the partial search query comprises an indication of a data source to be searched, and generating the plurality of autocomplete suggestions comprises identifying a subset of the metadata that is based on event data from the data source to be searched.

17. A non-transitory computer-readable medium storing instructions that are operable when executed by data processing apparatus to perform operations comprising:
   obtaining search results generated by an observability analysis system based on prior search queries, the search results comprising a subset of event data generated in a computing environment;
   obtaining metadata based on the event data, wherein the metadata are generated by analyzing the event data to identify:
     a plurality of fields; and
     values for each of the plurality of fields;
   after obtaining the metadata, receiving a partial search query through a user interface at a first computer node, the partial search query representing at least a portion of a request to search the event data;
   generating, at the first computer node, a plurality of autocomplete suggestions based on the partial search query and the metadata, wherein each of the plurality of autocomplete suggestions comprises one or both of:
     a suggested field selected from the plurality of fields; and
     a suggested value selected from the values; and
   displaying at least one of the plurality of autocomplete suggestions in the user interface at the first computer node.

18. The non-transitory computer-readable medium of claim 17, wherein the metadata comprises an indication of:
   the plurality of fields identified;
   data types for each of the plurality of fields; and
   the values for each of the plurality of fields.

19. The non-transitory computer-readable medium of claim 18, wherein the metadata comprises an indication of frequent values for the plurality of fields, and at least one of the plurality of autocomplete suggestions comprises the most frequent value for one of the plurality of fields.

20. The non-transitory computer-readable medium of claim 19, wherein the plurality of autocomplete suggestions comprise respective values for one of the plurality of fields, and the plurality of autocomplete suggestions are displayed in the user interface according to relative frequencies of the respective values.

* * * * *